Jan. 20, 1959  M. Z. MULLEN  2,869,286
APPARATUS FOR FORMING TUBULAR STRUCTURES IN GLASSWARE
Filed Oct. 28, 1955  3 Sheets-Sheet 2
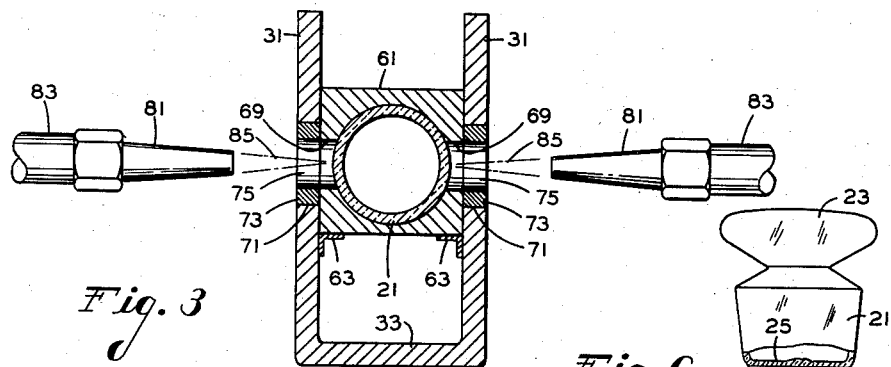
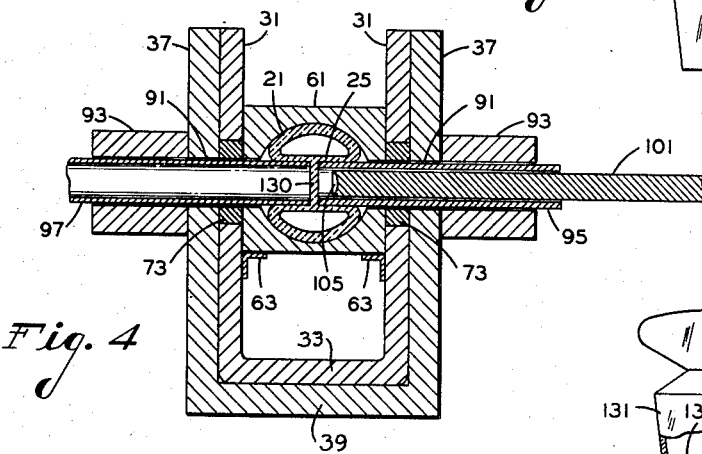
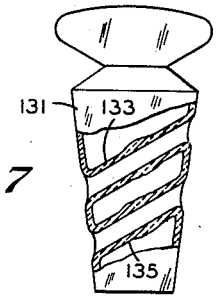
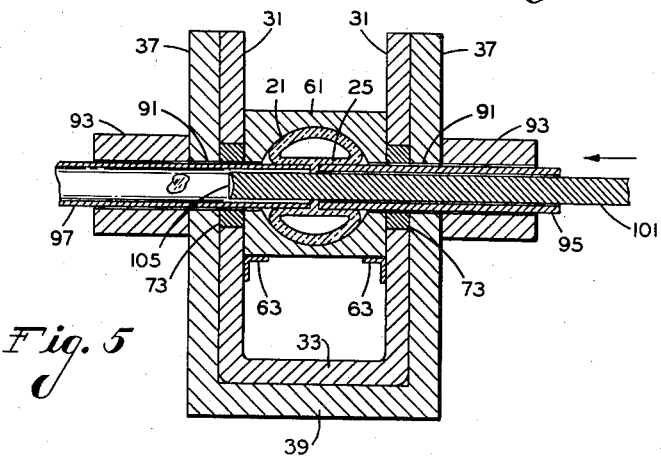

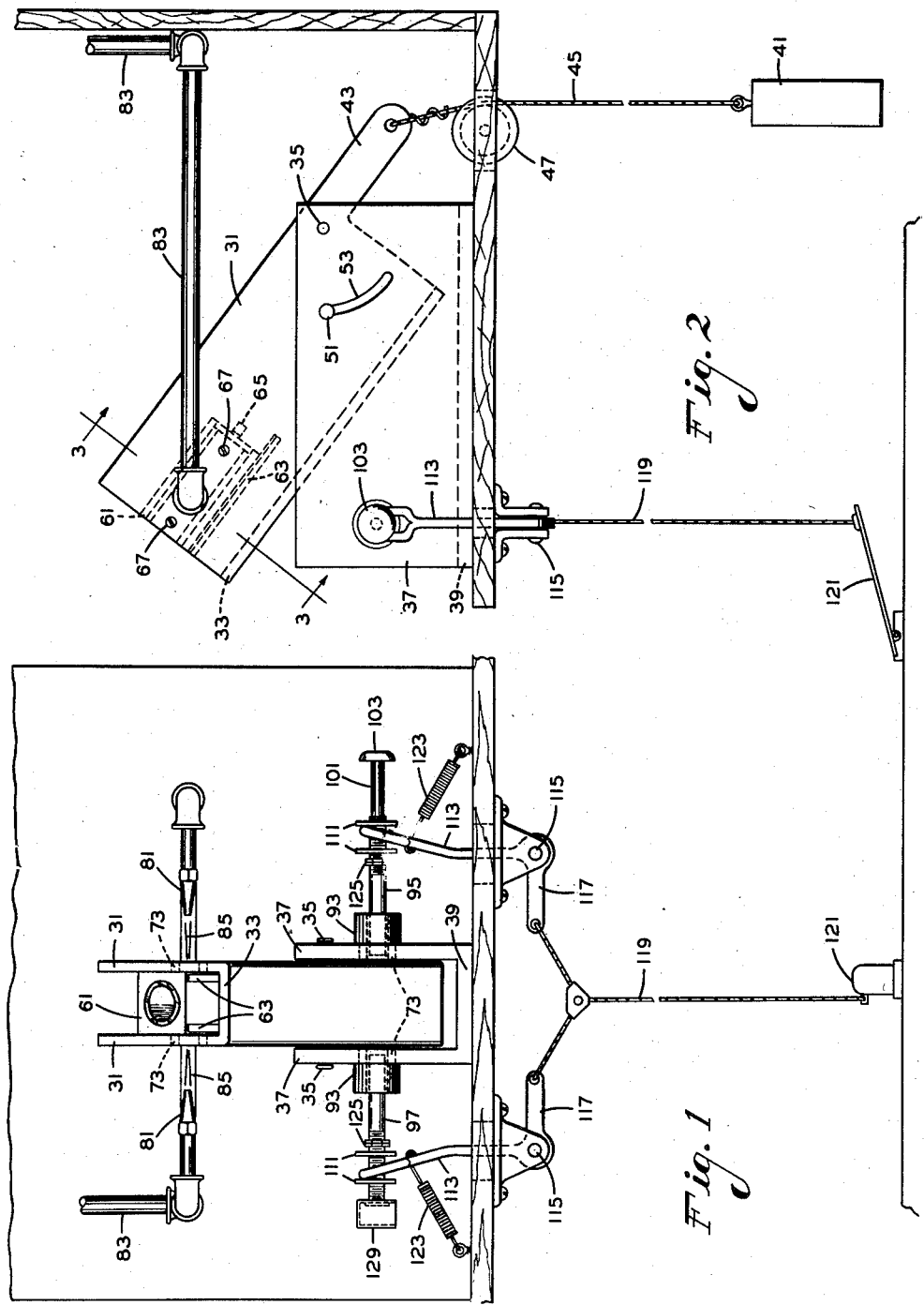

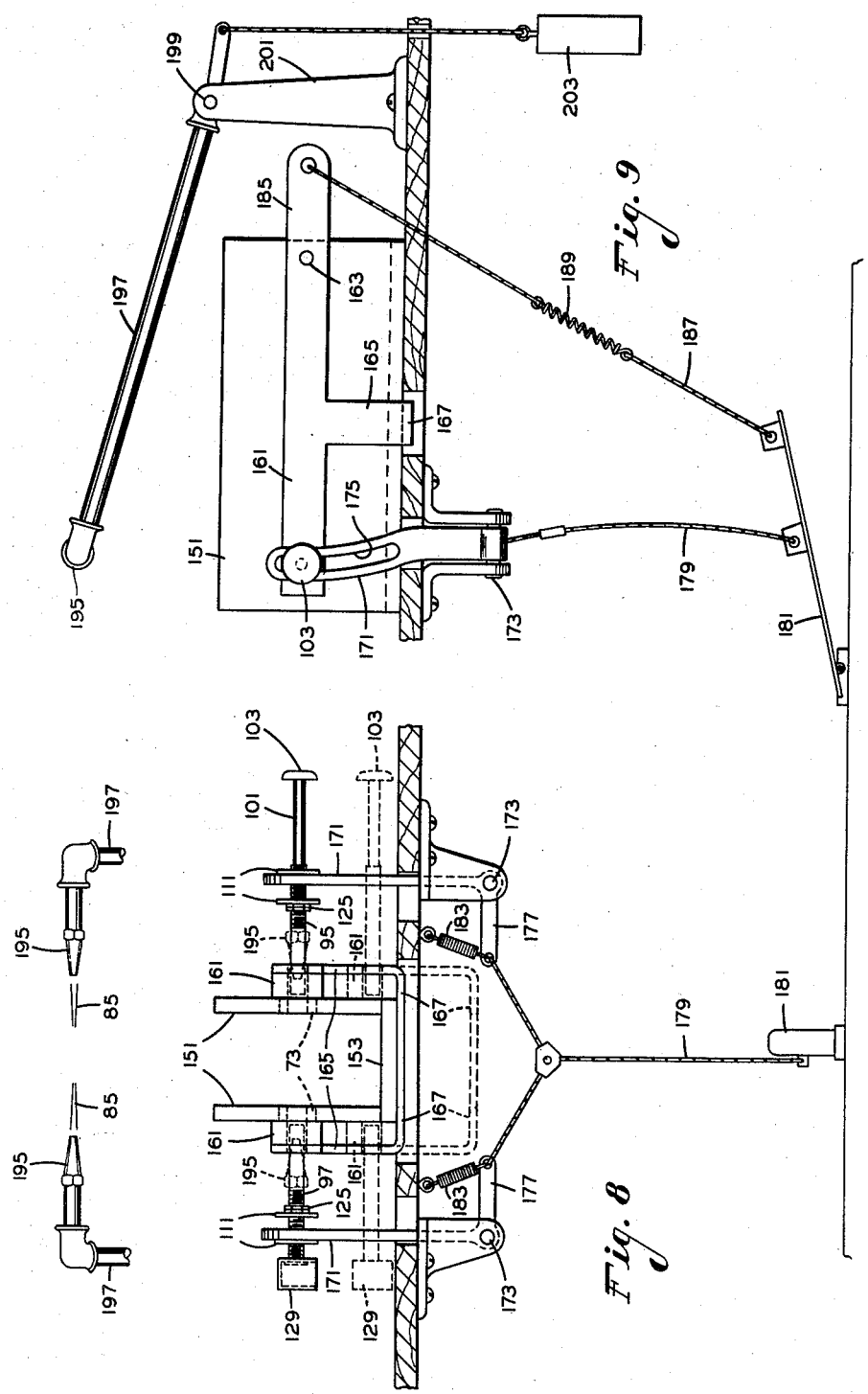

United States Patent Office 2,869,286
Patented Jan. 20, 1959

2,869,286

APPARATUS FOR FORMING TUBULAR STRUCTURES IN GLASSWARE

Melvin Z. Mullen, Rochester, N. Y., assignor of one-third to Jack G. Lubelle, Henrietta, and one-third to Lew C. Silverman, Rochester, N. Y.

Application October 28, 1955, Serial No. 543,381

9 Claims. (Cl. 49—7)

This invention relates to an apparatus for forming tubular structures in glassware, such for example as cross tubes or fluid passageways in hollow glass stoppers or stopcocks of the kind used in laboratory or chemical apparatus, or glass tubes extending through hollow glass articles such as bottles, for decorative or other purposes.

An object of the invention is the provision of a generally improved and more satisfactory apparatus for forming such tubular glass structures.

Another object is the provision of simple and inexpensive apparatus for forming such tubular glass structures.

Still another object is the provision of an apparatus by which transverse tubular structures may be formed easily and quickly in hollow glassware even though the axis of the tubular structure to be formed may be not perpendicular but rather oblique or inclined with respect to the axis of the hollow glass article in which the tube is to be formed.

A further object is the provision of a method, and of apparatus for carrying out such method, both of which are sufficiently simple so that they may be successfully operated by a relatively inexperienced operator.

A still further object is the provision of tube forming apparatus of rugged and sturdy construction, adapted to give satisfactory service over a relatively long life.

These and other desirable objects may be attained in the manner disclosed as an illustrative embodiment of the invention in the following description and in the accompanying drawings forming a part hereof, in which:

Fig. 1 is a front view of apparatus in accordance with one embodiment of the invention, with the parts in the upper or heating position;

Fig. 2 is a side elevation of the same, with the parts in the same position;

Fig. 3 is a section taken substantially on the line 3—3 of Fig. 2, on a larger scale, showing the glass article in heating position;

Fig. 4 is a somewhat similar view with the glass article and its holder lowered to tube forming position, and with the tube forming plungers thrust into the glass article;

Fig. 5 is a similar view at a later stage of operation of the plungers;

Fig. 6 is a side view, with parts in section, of one typical form of glass stopcock which may be produced by the present invention;

Fig. 7 is a similar view of another typical form of stopcock which may also be produced by the present invention;

Fig. 8 is a view similar to Fig. 1, showing an alternative form of apparatus; and Fig. 9 is a view similar to Fig. 2, showing the same alternative form illustrated in Fig. 8.

The same reference numerals throughout the several views indicate the same parts.

For certain purposes it is desirable to make tubular openings extending through hollow glass articles, such as bottles, where the openings may be used for decorative or other purposes, or glass stoppers of the kind employed in laboratories, where the openings may be used as connecting passages for fluid (liquid or gas) conduits. Certain methods for producing such tubular openings are disclosed in my copending application for United States patent, Serial No. 303,220, filed August 8, 1952, and scheduled to issue as U. S. Patent No. 2,722,086, dated November 1, 1955. The present invention constitutes in some respects a modification of and an improvement upon the invention disclosed in said copending application.

In the preferred form of the invention disclosed in said copending application, a difference in pressure of some suitable gas (e. g., ordinary atmospheric air) was relied upon to force a heated and softened part of the wall of the main glass article inwardly to form the desired tube. This has been found to be workable and satisfactory when it is desired to have the tube extend substantially perpendicular to the axis of the glass article, or approximately perpendicular to the side walls which are heated and softened when making the tube. However, the method of said copending application is not readily applicable to the construction of tubes which are to extend obliquely with respect to the wall from which they are formed, whereas the improvement of the present invention enables the formation of tubes from the heated and softened walls of glass articles, extending in any desired direction relative to such walls. Moreover, even when the tubes extend perpendicular to the walls from which they are formed, and thus are capable of being made by the practice of the invention disclosed in said copending application, the present improvement enables such tubes to be made quicker and more satisfactorily.

Referring now to Fig. 6 of the drawings, showing one form of tubular article which may be made according to the present invention, there is a typical glass stopper or stopcock of the single passageway type, comprising a main body portion 21 of tapered or frusto-conical shape and a handle portion 23 so that the stopper may be grasped and turned in a suitable glass socket (not shown) in which the stopper is used in ordinary laboratory practice. For the sake of lightness, the main body 21 is made hollow, and if the stopper is to function as a stopcock, it must be provided with a transverse passage which, upon properly turning the stopper, may be alined with suitable conduit openings in the socket, so that fluid may pass through the transverse passage. As seen in Fig. 6, the tubular transverse passage is indicated at 25, and opens at both ends at the inclined walls of the stopcock, so that when the stopcock is turned to a given position with respect to its socket, fluid may flow through the passageway 25. It is to the rapid and efficient formation of such tubular passageways in hollow glass bodies such as the stopcock body 21, that the present invention is directed. The present invention is equally applicable to tubular passageways which may be desired for decorative or other purposes in bottles or other hollow glass articles, as shown for example in said copending application.

According to the present invention, the glass tube extending through the hollow glass body is formed from glass which is drawn from the surrounding side walls of the original glass article, as was the case in said copending application. However, instead of relying upon a difference in fluid pressure (e. g., air pressure) to force the softened glass walls inwardly to make the tube, as was done in said copending application, the present invention utilizes plungers producing positive mechanical pressure upon the softened glass walls, in the desired places and in the proper directions, although it is within the scope of the invention to utilize fluid pressure differences in conjunction with and as a supplement to the positive plunger pressures which are used according to the present invention.

Referring now to the mechanism disclosed in Figs. 1–5 of the present drawings, there is here shown a main work holder of trough-like form, comprising two vertical side walls 31 spaced laterally from each other and connected to each other by a bottom wall 33, the work holder being pivoted at 35 to a stationary frame which is likewise of approximately trough shape, including side walls 37 spaced laterally from each other wide enough to receive the work holder 31, 33 between them, and connected to each other by a bottom wall 39. When the work holder is swung to its lowest position, it lies substantially entirely within the stationary frame 37, 39, with the bottom 33 of the work holder resting upon the bottom 39 of the stationary frame. A counterweight 41 connected to a rear arm 43 on the work holder by means of a cord 45 passing over an idler pulley 47, tends to raise the work holder to the upper position shown in Figs. 1 and 2, which upper position is determined by the engagement of a pin 51 on the work holder with the upper end of a slot 53 on the stationary frame 37.

Within this main work holder 31, 33 is a supplementary work holder or adapter 61, externally shaped to fit snugly between the walls 31 of the main work holder and internally shaped to fit closely around the work piece (hollow glass article) being operated upon. The supplementary work holder is held in place in any suitable manner within the main work holder; for example by means of positioning ledges or supports 63 and 65, if the adapter is intended to be taken out of the holder 31 for loading and unloading the glass article, or by means of recessed clamping screws 67 if the adapter is to be loaded and unloaded while it remains in the main holder 31. By the use of this adapter, the mechanism may be made to operate upon work pieces of various sizes and shapes, as various different adapters to fit various different sizes and shapes of work may all be placed within the same main work holder 31, whenever desired.

The adapter 61 is not only hollowed out interiorly to receive the glass article through which the tubes are to be formed (e. g., the stopcock 21, see Figs. 3 and 6) but also is formed with lateral openings 69 in the location where the transverse tube 25 is to be formed through the glass article 21. The side walls 31 of the work holder are likewise apertured at 71 opposite the openings 69 of the adapter, but the holes 71 in the walls 31 are larger, and contain bushings 73 of hard and tough material capable of withstanding repeated heating and cooling without warping or cracking, each bushing having a central aperture 75. The tungsten carbide material known as "Carboloy" is found to be very suitable for these bushings 73. Another advantage of using bushings is that the holes 71 in the walls 31 may be made quite large, and by using various insertable and replaceable bushings 73, the effective size of the hole may be brought down to match the size of the opening 69 in the adapter 61, depending upon the diameter of the tube which is to be formed in the particular glass article being operated upon.

In an appropriate location lined up with the openings 69 and 75, when the main work holder 31 is in its uppermost position shown in Fig. 2, are a pair of gas flame nozzles 81 supplied with gas through suitable piping 83 so that, when the parts are in the uppermost position of Figs. 1, 2, and 3, the gas flames 85 will pass through the holes 69 and 75 and will impinge upon the walls of the glass article 21 within the supplementary holder or adapter 61. When working with certain types of glass, the heat of flames from ordinary natural gas or manufactured gas is not sufficient, and it is desirable to supply the burner nozzles with compressed or bottled oxygen and a suitable high-heat gas such as propane.

The side walls 37 of the stationary frame are similarly apertured at 91 (Figs. 4 and 5) in locations opposite the apertures 69 and 75 when the main work holder 31 is lowered to its lowest position with the bottom wall 33 thereof resting on the bottom wall 39 of the stationary frame, as shown in Figs 4 and 5. Apertured blocks 93 are welded or otherwise secured to the outer surfaces of the walls 37, in alinement with the apertures 91, to provide a longer and better bearing for the tubular plungers 95 and 97 which are mounted in and adapted to move axially through the openings 91 and blocks 93 from the right and left side, respectively. These plungers preferably have equal outside diameters, of the size desired for the inside diameter of the glass tube which is to be formed transversely through the hollow glass article being operated upon. The inside diameters of the tubular plungers are preferably unequal, however, that of the left plunger 97 being slightly larger than that of the right plunger 95, and the latter slidably receives a solid plunger or push rod 101 provided with an enlarged head 103 at its right end and with a slightly concaved operating face 105 (Figs. 4 and 5) at its left end, so that a quite sharp cutting edge is provided around the periphery or circumference of the left end of the plunger 101. This plunger 101 fits snugly but easily slidable within the right hand tubular plunger 95, and can pass with slightly greater play or looseness through the left hand tubular plunger 97, on account of the inside diameter of the latter being slightly larger, as above mentioned. For example, if the glass tube is to have an internal diameter of 8 millimeters, the external diameter of both of the tubular plungers 95 and 97 will likewise be 8 mm. The internal diameter of the plunger 95 carrying the rod 101 may be about 6 mm., while the internal diameter of the other plunger 97 may be slightly larger, say 6½ mm. It will be noted from Figs. 4 and 5 that the advancing ends of the plungers 95 and 97 are blunt rather than sharp, thus being well adapted to draw the hot soft glass into the desired tubular form rather than to cut through it to form a hole in it.

Various materials which will withstand the necessary heat and pressure without warping or cracking and with minimum wear of the parts and minimum sticking to hot soft glass, may be used. It is preferable to make the tubular plungers 95 and 97 of tungsten carbide or "Carboloy," the same material above mentioned for the bushings 73, while the other plunger or push rod 101 is preferably made of tungsten, or a high tungsten alloy, so that it will remain straight and true even after repeated heatings and will not tend to warp in a manner to cause binding in its longitudinal travel within the tubular plungers 95 and 97. It may be mentioned here also that the walls 31 and 33 of the main work holder are preferably made of Monel metal. The walls 37 and 39 of the fixed frame may be of any suitable and less expensive material, such as ordinary steel plates.

The plungers 95 and 97 are preferably operated mechanically by any suitable means such as foot power. To this end, each of the plungers is provided with a pair of axially spaced collars 111, which receive between them one arm 113 of a bellcrank lever pivoted at 115 and having a second arm 117 connected by a suitable chain or cord 119 to a foot treadle 121. A spring 123 connected to the arm 113 of each bellcrank tends to pull the bellcrank outwardly to retract its associated plunger to the position shown in Fig. 1, where the inner end of the plunger lies within the thickness of the wall 37 and clears the wall 31 and bushing 73 so as not to interfere with the upward and downward movements of the latter. By pushing downwardly on the treadle or pedal 121, both bellcranks are simultaneously actuated so as to push the respective plungers 95 and 97 axially inwardly toward each other to the position shown in Fig. 4, the innermost position of each plunger being determined by a pair of lock nuts 125 threaded exteriorly on the plunger and serving as an abutment to contact with the outer face of the block 93 to determine the extent to which the plunger may be thrust inwardly.

At the left end of the left plunger 97 is a small box-like structure 129 of metal, open at its bottom and closed at the other sides, into which structure the end of the plunger opens. The purpose of this box 129 is simply to stop the leftward motion of a piece of scrap glass which is pushed out through the plunger 97 during normal operation, as explained below, so that this piece of scrap glass will not be projected violently for some distance beyond the plunger 97, but will hit the left wall of the box 129 and then drop by gravity downwardly into a suitable scrap receptacle.

The operation of the mechanism thus far described, and the operation of the method of the present invention, are as follows: The hollow glass article through which the tube is to be formed, such for example as the stopper or stopcock 21, is placed in the adapter 61, either before or after the adapter is placed in the main work holder 31. Then the work holder 31, carrying the glass article loaded in it, is raised to the uppermost position shown in Figs. 1 and 2. This raising may be accomplished by letting go of the work holder so that the counterweight 41 raises it, or the cord 45 may be connected to a second foot treadle or pedal instead of to a counterweight, so that the operator steps on this second treadle to raise the work.

In the upper position of the work holder, the openings 69 and 75 are opposite the flames 85 issuing from the gas nozzles 81, and the flames quickly soften that portion of the glass body which is in alignment with the openings 69, the rest of the body remaining compartively cool and rigid due to its contact with the relatively cool adapter or supplementary work holder 61.

After a sufficient period of heating the glass (e. g., about thirty seconds) to make it relatively soft and flowable, the work holder is lowered to the position within the stationary frame plates 37, as show in Figs. 4 and 5. This lowering is accomplished either by manual force pulling downwardly on the work holder against the counterweight 41, or by simply releasing the pressure on the second foot pedal if the cord 45 is attached to a treadle rather than to a counterweight. The lowering of the work holder brings the openings 69 and 75 directly opposite the tubular plungers 95 and 97.

Then the operator moves the plungers 95 and 97 axially toward each other, by stepping on the treadle 121 which, through the bellcranks 113, 117, pushes the plungers inwardly. This inward motion is accomplished gradually and gently, taking say five to ten seconds or more, and it pushes the softened glass walls of the article 21 inwardly to form two tubes which finally meet approximately at the center of the article, as seen in Fig. 4, where the end walls of the two tubes join each other and coalesce with each other to form a single partition 130 in the formed but still imperforate tube 25. Preferably there are cooperating abutment parts on the plunger 95 and rod 101 to keep the left end of the rod from being retracted more than a short distance (say 5 mm.) inside the left end of the plunger 95. Thus as the plunger 95 advances leftwardly, the rod advances with it, close to the end of the plunger, and no substantial amount of air is trapped between the rod and the partition 130. The stop nuts 125 are so adjusted on the shanks of the plungers that when the plungers are in their innermost position, they do not quite meet each other but are slightly separated to allow room for the partition 130 in the glass tube, as seen in Fig. 4.

When the plungers reach this innermost position, the operator then moves the third plunger or push rod 101 leftwardly, preferably by a blow of his hand against the head 103. The sharp cutting edge around the concave face 105 at the left end of the plunger 101 cuts through the glass partition 130 as seen in Fig. 5 (it being remembered that the glass is still hot and somewhat soft at this time) and the longitudinal motion of the rod 101 is continued until the scrap piece of glass cut from the partition is shoved leftwardly through the tubular plunger 97 all the way to the end thereof, where it drops out the bottom of the box 129 onto a suitable scrap receptacle.

The rod 101 is then withdrawn rightwardly again, and the foot pressure on the treadle 121 is released so that the springs 123 draw the plungers 95 and 97 to their outer positions beyond the walls 31. For many purposes, the formation of the cross tube 25 in the glass article may now be regarded as finished, and the article may be withdrawn from the holder or adapter 61, ready for use. However, at this time there will be a slight ridge around the interior face of the cross tube 25 in the article 21, approximately at the center thereof. This ridge will have a radial dimension approximately equal to the thickness of the wall of the tubular plunger 95, and will be the remnant of the central partition 130 in the glass tube, which was left after the center thereof was cut out by the push rod 101. If this slight ridge is not objectionable, the glass article may be regarded as finished, as above mentioned, and may be removed from the holder. However, if there is any objection to this ridge, then instead of removing the article at this time from the holder, the holder is once more raised to its upper position and the flames 85 are allowed to enter the glass tube for a few seconds, heating the glass to soften it again. A sizing rod of suitable metal (e. g., of tungsten) is then thrust manually through the glass tube 25, to open up the constricted part of the tube where the above mentioned ridge was formed, forcing the excess glass at this point to bulge outwardly on the external diameter of the cross tube 25, as shown in Fig. 6, while leaving the interior of the bore smooth and without any evidence of a constriction or ridge.

Neither the method nor the apparatus are limited to tubes extending straight through the hollow glass article, perpendicular to the axis. For certain types of stopcocks used in laboratories, it may be desired to have one or more passages extending obliquely through the stopcock, an example of this being the stopcock 131 shown in Fig. 7, having a first tubular passage 133 and a second tubular passage 135, both extending obliquely. If the work holder 31 is made wide enough (that is, with enough lateral space between the two side walls 31) then the adapter 61 may be formed so that the axis of the work piece is not parallel to the side walls 31 but lies at any desired oblique angle between the walls 31, thereby enabling oblique passageways to be formed through the glass article, like the passageways 133 and 135 in Fig. 7. The passageways may be formed one at a time, moving the adapter 61 to a second position within the work holder 31 after the first passageway has been formed. Or, if preferred, two sets of plungers may be mounted side by side in appropriate positions, both operated by the same foot treadle 121, and two sets of holes 69, 75 may be formed in the adapter 61 and main work holder 31, and may be used with two sets of gas flame nozzles 81, so that both of the tubes 133 and 135 may be formed simultaneously in a single operation. To those familiar with the prior practice in forming passageways through glass stopcocks and the like the advantages of the present invention will be readily apparent, since the practice of the present invention saves a great deal of time as compared with the slow and tedious procedure formerly used, where the passages were customarily formed by cutting holes through the side walls of the glass stopper, inserting previously formed glass tubes, and welding or fusing the ends of the glass tubes to the side walls of the stopper.

It will be noted that in the construction disclosed in Figs. 1–5, the plungers are mounted in a stationary location (although axially movable) and the gas flames are in a stationary location, and it is the work holder which is mounted for movement between a position in which the heating flames will play upon the work and a position in which the plungers will cooperate with the work. This arrangement is not necessarily the case, however, for it is equally within the scope of the invention to mount the work holder in a stationary position, and to mount the gas flames and the plungers movably so that first the gas flames may be brought into cooperative relation to the stationary work, and then the plungers may be brought into cooperative relation thereto. Such an alternative arrangement is shown in Figs. 8 and 9, which are somewhat schematic or diagrammatic without going into all of the details, because most of the details will be essentially the same as in Figs. 1–5 and can be understood from the preceding description thereof.

Referring now to this alternative arrangement shown in Figs. 8 and 9, which is preferred in many instances, the main work holder includes the side plates 151 and the bottom plate 153, corresponding in general to the plates 31 and 33 of the previous embodiment except that the entire work holder is here mounted in a stationary position. This work holder receives the supplementary work holder or adapter 61, the same as in the previous embodiment, and it has the same bushings 73 as before.

The plungers, identified by the same numerals 95, 97, and 101 used in the previous embodiment, and constructed in the same way, are here mounted, not on a stationary frame, but on a pair of arms 161 pivoted at 163 to the main stationary work holder plates 151, so as to swing upwardly and downwardly just outside the outer faces of the stationary plates 151. The two arms 161 on opposite sides of the device are joined together by a stirrup which extends downwardly at 165 on each side, then across the bottom at 167 to join the downwardly extending piece 165 of the other side arm, thereby insuring that both of the arms 161 will move upwardly and downwardly together, while the cross piece 167 at the bottom, coming up against the bottom of the plates 151, 153, serves also as a stop or abutment to determine the uppermost position of the arms 161.

The plungers are moved inwardly and outwardly, just as in the previous embodiment, by means of bellcrank arms 171 pivoted at 173 and provided with arcuate slots 175 (see Fig. 9) concentric with the pivots 163, which embrace the shanks of the plungers 95 and 97 between the collars 111 thereon, without interfering with upward and downward movement of the plungers when the arms 161 swing upwardly and downwardly on the pivots 163. As in the previous embodiment, other arms 177 on the bellcrank are connected by a cord or chain 179 to a treadle or foot pedal 181, so that when the treadle is depressed, the arms 177 move downwardly and the arms 171 move inwardly to thrust the plungers 95 and 97 axially toward each other (only when the supporting arms 161 are in their uppermost positions, of course) to form the tube in the softened glass. Springs 183 tend to return the bellcranks to their normal position of rest, in which position the portions 171 containing the slots 175 lie in vertical planes parallel to the side walls 151 of the work holder, so that there will be no axial movement of the plungers when the plungers move up and down with the upward and downward swinging of the arms 161.

A rearward extension 185 on one or both of the side arms 161 is connected by a chain or cord 187 to the same treadle 181 which operates the plungers, this connection containing, however, an expansible spring 189. The lengths of the cords 179 and 187 are so chosen that during the first part of the downward movement of the treadle 181, the cord 179 remains slack, while the cord 187 pulls downwardly on the extension 185 to raise the arms 161 to their maximum upward position as shown in full lines in Figs. 8 and 9, bringing the plungers opposite the central holes in the bushings 73 of the work holder. Then as further downward pressure is applied to the treadle 181, the spring 189 stretches, still holding the arms 161 in the upper position, and the cord 179 now begins to act on the bellcranks 171, 177, to thrust the plungers 95 and 97 axially inwardly toward each other, producing the same action as in the previous embodiment. When the treadle 181 is released, the spring 189 maintains the pull on the cord 187 to hold the arms 161 in the upper position until after the plungers have been sufficiently withdrawn so as to clear the walls 151, whereupon the further upward movement of the treadle allows the arms 161 to drop downwardly below the bushings 73, to the broken line position shown in Fig. 8, to clear the space in front of the bushings so that the heating flames may be brought down to bear against the work in the holder 151.

The heating flames are fueled by gas issuing from nozzles 195 the same as the nozzles 81 previously described, supplied with gas through suitable pipes 197, the difference being that in the previous embodiment the nozzles 81 and pipes 83 were preferably rigid or stationary, whereas in the present instance the supply pipes 197 are pivoted at 199 on a suitable support 201, and are counterweighted as at 203 to tend to keep the nozzles 195 at an elevated position as shown in Fig. 9 and in full lines in Fig. 8. However, by grasping the pipe 197 or a convenient handle affixed thereto, and pulling downwardly with slight pressure, the operator may swing the nozzles 195 down to the dotted line position shown in Fig. 8 (while the arms 161 and the plungers are moved down to their dotted line positions, out of the way) so that the flames will impinge on the work, through the openings in the bushings 73 and the corresponding openings in the supplementary work holder or adapter 61 mounted within the main work holder 151.

The operation of this alternative construction is substantially the same as that previously described, except that here it is the work which is stationary and the flames and plungers which are movable, instead of the other way around. For fast production, there may be a substantial advantage in having the work stationary. The work is loaded into the work holder, and all pressure on the treadle 181 is released so that the arms 161 and the plungers carried by them drop to the lowermost position. The operator then brings the gas flames down to a position opposite the bushings 73 in the work holder 151, so that the flames pass through the central opening in the bushing and the corresponding opening in the adapter, to heat the glass walls opposite these openings, just as before. When the heating cycle has been completed, the operator lets go of the gas nozzles so that the counterweight 203 quickly raises them to the upper position out of the way, and the operator then steps on the treadle 181, first raising the arms 161 to effective operating position and then thrusting the plungers 95 and 97 axially inwardly toward each other, engaging the softened glass walls of the work to form the tube just as before. Then the solid plunger or push rod 101 is actuated to cut out the center of the partition, just as before, and the flames may again be brought to bear on the work and a sizing rod may be inserted, to eliminate the interior ridge and force the excess glass out to a ridge or bulge on the outside of the tube 25.

Although the method of the present invention is preferably carried out by using the apparatus of the present invention, the method is not dependent upon the apparatus, and may be practiced by hand. For example, the side walls of the hollow glass article may be suitably heated to soften them locally, then plungers may be manually held and manually thrust axially inwardly either simultaneously from both sides or successively first from one side and then from the other. Then a cutting tool may be inserted into the formed glass tube by hand, to cut through the central partition, which cutting tool need not be inserted through a hollow plunger but may be inserted directly into the glass tube independently of any tubular plunger. And the cutting tool may also serve as the sizing rod to eliminate any ridge or construction within the glass tube, by giving this tool a slight revolutionary motion, by hand. Of course the glass tube may be reheated by the flames, before sizing or before cutting through the partition, if it cools too quickly during the forming operation.

By means of the present invention, satisfactory glass tubes may be formed in hollow glassware, with a length several times the diameter of the tube. For example, in a hollow glass stopcock such as 21 (Fig. 6) or 131 (Fig. 7), the present invention may be used to produce tubes 25 or 133 or 135 having an internal diameter of about 8 or 10 millimeters and a length in the range of about 30 to 50 millimeters or even more.

One of the advantages of the present invention is that the work holder may actually constitute the forming mold of an automatic glass-article-forming machine, otherwise of known construction. That is, instead of placing a previously formed and cooled glass article in the work holder, the lateral openings or apertures 75 may be formed directly in the mold of a known machine for forming bottles or other hollow glass articles, and the plungers 96, 97, and 101 may operate upon the glass while it is still hot and soft from the original forming operation, thus eliminating the need for the separate heating flames from the nozzles 81 or 195.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. Apparatus for forming a glass tube extending across the interior of a hollow glass article between two spaced walls thereof, said tube being open throughout its length, said apparatus including a main work holder, an adapter mounted in said main work holder and encompassing at least a substantial part of the glass article to be operated upon, said adapter and work holder having alined apertures opposite those points on the walls of the glass article where the tube is to be formed, a plunger holder, a pair of plungers carried by said plunger holder and longitudinally alined with each other on opposite sides of said work holder, said work holder and plunger holder being mounted for relative movement with respect to each other from a position in which said plungers are longitudinally alined with said apertures to a position offset from said apertures, both of said plungers being tubular, a pair of heating flame nozzles alined with and directed toward each other and spaced from each other, said work holder and flame nozzles being mounted for relative movement with respect to each other from a position in which said nozzles are offset from said apertures to a position in which said nozzles are alined with said apertures so that flames therefrom may enter said apertures and impinge upon a glass article held in said adapter, to soften those portions of the walls thereof which are opposite said apertures, means for moving said plungers longitudinally toward each other when they are alined with said apertures to deform the softened walls inwardly to make tubular extensions meeting each other with an approximately central partition formed by the inner ends of the two tubular extensions produced respectively by the two plungers, and a push rod movable longitudinally through said tubular plungers to form an opening through said partition.

2. Apparatus for forming a glass tube extending across the interior of a hollow glass article between two spaced walls thereof, said tube being open throughout its length, said apparatus including a main work holder, an adapter mounted in said main work holder and encompassing at least a substantial part of the glass article to be operated upon, said adapter and work holder having alined apertures opposite those points on the walls of the glass article where the tube is to be formed, a plunger holder, a pair of plungers carried by said plunger holder and longitudinally alined with each other on opposite sides of said work holder, said work holder and plunger holder being mounted for relative movement with respect to each other from a position in which said plungers are longitudinally alined with said apertures to a position offset from said apertures, both of said plungers being tubular, both plungers having substantially equal outside diameters and unequal inside diameters, a pair of heating flame nozzles alined with and directed toward each other and spaced from each other, said work holder and flame nozzles being mounted for relative movement with respect to each other from a position in which said nozzles are offset from said apertures to a position in which said nozzles are alined with said apertures so that flames therefrom may enter said apertures and impinge upon a glass article held in said adapter, to soften those portions of the walls thereof which are opposite said apertures, means for moving said plungers longitudinally toward each other when they are alined with said apertures to deform the softened walls inwardly to make tubular extensions meeting each other with an approximately central partition formed by the inner ends of the two tubular extensions produced respectively by the two plungers, and a push rod mounted in that one of the tubular plungers having the smaller inside diameter and movable longitudinally through it and the other plunger, to form an opening through said partition.

3. A construction as defined in claim 2, in which both of said plungers are made substantially of tungsten carbide.

4. A construction as defined in claim 2, in which said push rod is made substantially of tungsten.

5. A construction as defined in claim 2, in which said push rod has a partition-contacting end of concave shape with a cutting edge at its periphery.

6. A construction as defined in claim 1, in which said apertures in said work holder are formed through bushings made substantially of tungsten carbide.

7. A construction as defined in claim 1, in which said work holder is formed at least in part of Monel metal.

8. Apparatus for forming an open cross tube of glass extending across the interior of a hollow glass article having laterally spaced side walls, said apparatus comprising a holder for encompassing the major part of the exterior area of the hollow glass article while portions of opposite side walls thereof are in hot and flowable condition, said holder having apertures in its opposite side walls in alinement with those points on the walls of the glass article where the tube is to be formed, a first tubular plunger movable axially in a straight line through one of said apertures of said holder to press inwardly on a hot flowable portion of one side wall of said glass article to draw a tube inwardly from said side wall in a direction across the space within said hollow glass article, a second tubular plunger also movable axially in a straight line through another of said apertures of said holder to press inwardly on a hot flowable portion of an opposite side wall of said glass article to draw a tube inwardly from said opposite side wall in a direction across the space within said hollow glass article and in alinement with the tube drawn by said first plunger, the range of movement of said plungers being such that the respective tubes drawn by said first and second plungers will meet and join each other near the middle of said hollow glass article and the two plungers will not meet, leaving a partition extending across the tube between the two plungers, and a third plunger movable axially within portions of said first and second plungers to form an opening through said partition.

9. Apparatus for forming an open cross tube of glass extending across the interior of a hollow glass article having laterally spaced side walls, said apparatus comprising a holder for encompassing the major part of the exterior area of the hollow glass article while portions of opposite side walls thereof are in hot and flowable condition, said holder having apertures in its opposite side walls in alinement with those points on the walls of the glass article where the tube is to be formed, a first tubular plunger movable axially in a straight line through one of said apertures of said holder to press inwardly on a hot flowable portion of one side wall of said glass article to draw a tube inwardly from said side wall in a direction across the space within said hollow glass article, a second tubular plunger also movable axially in a straight line through another of said apertures of said holder to press inwardly on a hot flowable portion of an opposite side wall of said glass article to draw a tube inwardly from said opposite side wall in a direction across the space within said hollow glass article and in alinement with the tube drawn by said first plunger, both of said first and second plungers having blunt ends adapted to draw closed-end tubes from said hot flowable glass without substantial cutting through such glass, the range of movement of said plungers being such that the respective plungers will come close to each other but not meet, and the respective closed-end tubes drawn by said first and second plungers will meet and join each other near the middle of said hollow glass article and the closed ends of the two tube portions will coalesce to form a partition across the tube, and a third plunger movable axially within portions of said first and second plungers to form an opening through said partition.

References Cited in the file of this patent

UNITED STATES PATENTS

| | | |
|---|---|---|
| 810,474 | Doane | Jan. 23, 1906 |
| 1,628,342 | Tyson | May 10, 1927 |
| 1,824,216 | Klopp | Sept. 22, 1931 |
| 2,146,572 | Hahn et al. | Feb. 7, 1939 |
| 2,523,006 | Gaskill et al. | Sept. 19, 1950 |
| 2,573,429 | Geier | Oct. 30, 1951 |
| 2,704,125 | Taylor | Mar. 15, 1955 |
| 2,722,086 | Mullen | Nov. 1, 1955 |